US011810245B2

(12) United States Patent
Davey et al.

(10) Patent No.: US 11,810,245 B2
(45) Date of Patent: Nov. 7, 2023

(54) METHODS AND SYSTEMS FOR PRIORITIZED REPLICATION OF A VIRTUAL WORLD

(71) Applicant: Verizon Patent and Licensing Inc., Basking Ridge, NJ (US)

(72) Inventors: William Robert Davey, Somerville, NJ (US); James Susinno, Wellesley, MA (US); Vito Joseph Messina, Somerville, NJ (US); Oliver S. Castaneda, West Henrietta, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 128 days.

(21) Appl. No.: 17/411,976

(22) Filed: Aug. 25, 2021

(65) Prior Publication Data
US 2023/0064652 A1    Mar. 2, 2023

(51) Int. Cl.
| G06T 15/20 | (2011.01) |
| G06T 15/08 | (2011.01) |
| G06T 17/20 | (2006.01) |
| H04S 7/00  | (2006.01) |
| G06T 15/04 | (2011.01) |

(52) U.S. Cl.
CPC ............ G06T 15/20 (2013.01); G06T 15/04 (2013.01); G06T 15/08 (2013.01); G06T 17/20 (2013.01); H04S 7/302 (2013.01); H04S 2400/11 (2013.01)

(58) Field of Classification Search
None
See application file for complete search history.

(56) References Cited

U.S. PATENT DOCUMENTS

| 9,959,675 | B2 * | 5/2018 | Gal ......................... G06F 30/00 |
| 10,341,424 | B1 * | 7/2019 | Mendes da Costa ........................ G06F 40/169 |
| 10,722,800 | B2 * | 7/2020 | Tilton ..................... G06F 3/011 |
| 11,024,073 | B2 * | 6/2021 | Sagong ................. G06T 15/005 |

FOREIGN PATENT DOCUMENTS

WO    WO-2022242854 A1 * 11/2022

* cited by examiner

*Primary Examiner* — Saptarshi Mazumder

(57) ABSTRACT

An illustrative server system receives a request from a client device to join a virtual world managed by the server system. In response to receiving the request, the server system identifies an avatar location for an avatar that is to represent a user of the client device within the virtual world when the client device joins the virtual world. Based on the avatar location, the server system determines a first priority value for a first asset of the virtual world and a second priority value for a second asset of the virtual world. Based on the first and second priority values, the server system provides to the client device a prioritized replication of the virtual world in which the first asset is replicated in a prioritized manner that allows the user to experience the first asset before the second asset is replicated. Corresponding methods and systems are also disclosed.

20 Claims, 10 Drawing Sheets

METHODS AND SYSTEMS FOR PRIORITIZED REPLICATION OF A VIRTUAL WORLD

BACKGROUND INFORMATION

Various types of virtual worlds are available for people to experience for a variety of purposes and in a variety of applications. As one example, three-dimensional (3D) virtual worlds used in video games and other types of media content provide users freedom to explore and interact with the virtual world and objects included therein. As another example, extended reality (XR) virtual worlds such as virtual reality (VR) worlds and augmented reality (AR) worlds (also referred to as mixed reality worlds) may provide opportunities for interacting with virtual elements at a higher level of immersiveness than conventional 3D video games. For instance, VR worlds may be configured to fully immerse users by allowing them to move about within virtual spaces and see, hear, and/or interact with virtual objects and/or virtual avatars of other users in ways analogous to real-world experiences. Similarly, AR worlds allow users to continue to experience the real world around them to at least some degree (e.g., seeing real objects in their environment by way of a partially transparent heads-up display, video passed through from a head-mounted camera, etc.) while also being presented with virtual elements and augmentations that do not exist in the real world.

Various entertainment, educational, professional, communication, and other objectives may be served by applications that present a variety of different types of virtual worlds. However, successful deployment of each of these virtual worlds may require that significant stores of data be managed, communicated, and accessed to represent the virtual worlds and/or the various assets (e.g., virtual elements and attributes) included therein. Handling and moving this data in ways that are efficient and conducive to high quality experiences in the virtual worlds may present various challenges.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

DETAILED DESCRIPTION OF EXAMPLE EMBODIMENTS

Figure 1:
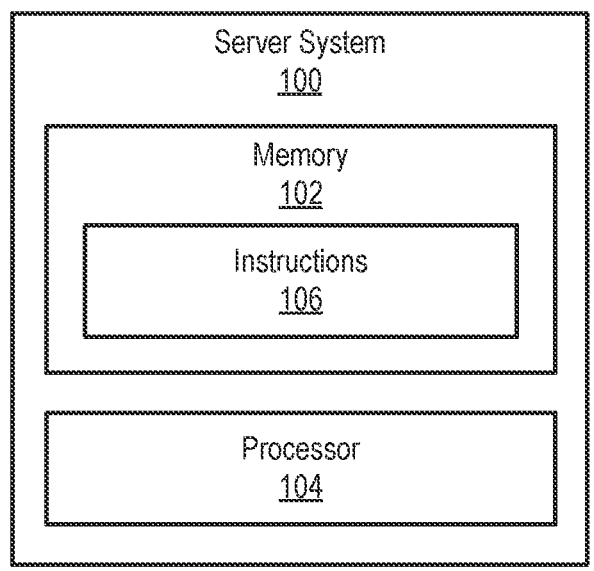
FIG. 1 shows an illustrative server system configured to provide prioritized replication of a virtual world to bypass asset preloading in accordance with principles described herein.

Methods and systems for prioritized replication of a virtual world to bypass asset preloading are described herein. As mentioned above, virtual worlds may be represented by relatively large amounts of data that must be accessed by a virtual world presentation device (a "client device") to present the virtual world to a person wishing to experience the virtual world (a "user" of the client device). Conventionally, client devices have been configured to secure immediate access to all the data representing a particular virtual world prior to presenting the virtual world to the user. For example, before a user can enter and begin experiencing a particular level of a 3D video game, a "map pack" would typically be downloaded and installed that includes data representative of various assets associated with the virtual world of that level (e.g., world layouts, virtual objects, attributes of the objects, etc.). Client devices may access the asset data for a virtual world from a local source (e.g., a hard drive, an optical disc, etc.) if available, or, in cases in which asset data is not locally available, client devices may preload the data from a server system managing the virtual world. For example, multiuser (e.g., multiplayer, multiclient, etc.) virtual worlds managed by a multi-access server (i.e., a server system that provides data services to a plurality of different client devices) generally require asset data to be provided to client devices by the multi-access server so that the client devices may all concurrently join and interact within the virtual world that the server system manages. Asset data provided to a client device to allow the client device to present a virtual world is referred to as being "replicated" to the client device since each client device participating in the multiuser virtual world receives its own copy (or replication) of the same data that the multi-access server is managing to represent the virtual world and its various assets.

The immersiveness, responsiveness, and usability of certain virtual world applications may be limited undesirably by replication models that rely on data preloading. For example, a virtual reality (VR) application configured to provide virtual face-to-face communication for coworkers in a virtual office space may involve a relatively large number of different virtual worlds that a user may desire to switch between quickly and conveniently. Virtual worlds corresponding to different departments in the organization, different conference rooms, different coworker offices, and so forth, could all be included as part of the virtual office space for instance, and it may be desirable for a user to jump between these different worlds quickly and without burdensome preloading latencies. While such preloading latencies would perhaps not seem extremely inconvenient for a user entering a new level of a 3D video game (since this scenario happens less frequently, since the user may be distracted learning about his or her mission on the new level, etc.), preloading latencies in applications such as this virtual office space may constrain users more significantly. For example, it may be highly detrimental to the overall objectives of the VR application if users within a busy virtual office environment who intend to move from place to place and communicate with one another at the speed of thought are repeatedly forced to pause and hold their thoughts while waiting for the virtual world to fully load.

Accordingly, methods and systems described herein relate to ways of performing prioritized replication of virtual worlds in a manner that bypasses asset preloading on the client side. Using techniques described herein, client devices may enter and experience (e.g., view, interact with, etc.) multiuser virtual worlds hosted by multi-access server systems without inconvenient latencies associated with asset preloading, even if the client devices have no local access to data representative of the world beforehand. In this way, client devices may quickly and conveniently join and experience new worlds, and move between worlds, without any need for reinstalling client applications or preloading large level files or map packs.

As will be described in more detail below, prioritized replications of virtual worlds described herein may be accomplished in various ways, including by serializing data about each asset of the virtual world (e.g., each virtual object, object attribute, or other entity associated with the world) and by transmitting this serialized data in a prioritized manner (e.g., with more important or relevant assets first) to connected client devices over a network (e.g., using User Datagram Protocol (UDP), Transmission Control Protocol (TCP), or another suitable network transfer protocol as may serve a particular implementation). As will be detailed below, serialized data replicated in this way may contain information about the appearance, pose, interactivity, and various other relevant information for a given virtual object, and may be used by the client device to recreate the virtual world and present the world to a user of the client device.

Methods and systems described herein for prioritized replication of a virtual world to bypass asset preloading may provide various benefits and advantages. For example, as described above, prioritized replication of virtual world assets may allow users more convenient and responsive movement between virtual worlds as the most relevant assets of new virtual worlds (e.g., nearby virtual objects, attributes of objects that will immediately influence the user's experience, etc.) are prioritized in the replication process and can begin being presented to the user even before less relevant assets (e.g., virtual objects that are further away, attributes of objects that will not yet influence the user's experience, etc.) have been replicated. Additionally, as will be further described below, similar prioritization techniques may be employed even after a virtual world has been fully replicated to allow updates to world assets to also be provided and received in ways that are efficient and optimized to provide a high-quality user experience. Techniques for prioritized replication of virtual worlds described herein may also provide benefits related to efficiencies in the data that is transmitted, stored in memory, and so forth. For example, network and memory usage may be reduced in some circumstances compared to conventional preloading-based replication models since only high-priority assets may ever be loaded for a virtual world that a user enters only briefly and since low-priority updates may be made less frequently or on an as-needed basis.

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. Methods and systems described herein for prioritized replication of a virtual world to bypass asset preloading may provide any of the benefits mentioned above, as well as various additional and/or alternative benefits that will be described and/or made apparent below.

FIG. 1 shows an illustrative server system 100 ("system 100") configured to provide prioritized replication of a virtual world to bypass asset preloading in accordance with principles described herein. System 100 may be implemented by computer resources such as processors, memory facilities, storage facilities, communication interfaces, and so forth. System 100 may be partially or fully implemented by computing systems that are located remotely from users and/or accessed by a plurality of user equipment (UE) devices, such as distributed computing systems operated by a cellular data provider (e.g., multi-access edge compute (MEC) systems), distributed computing systems operated by a cloud-computing provider (e.g., multi-access cloud compute systems), or other suitable server systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with prioritized replication of a virtual world to bypass asset preloading as described herein and/or as may serve a particular implementation.

Figure 2:
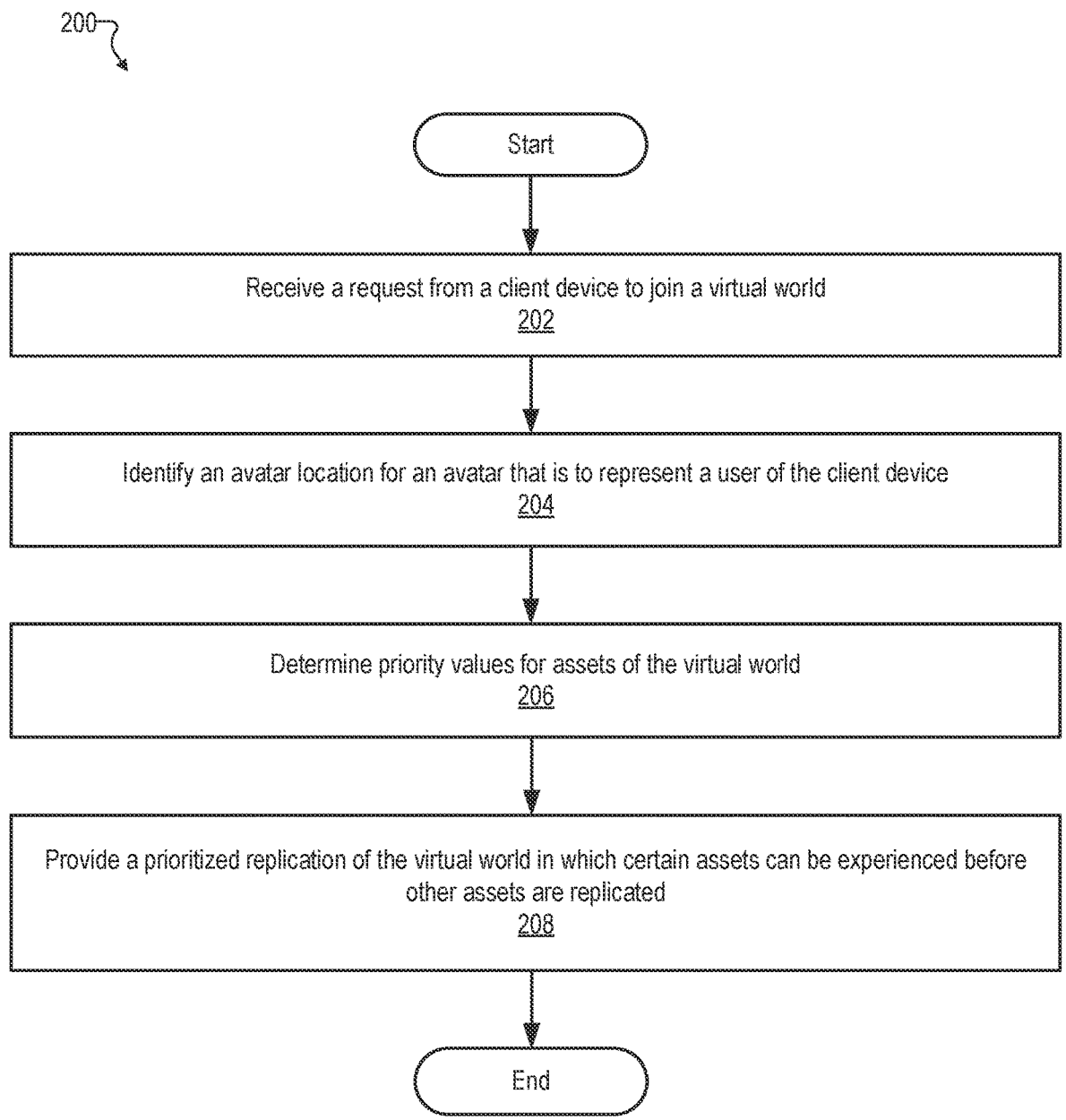
FIG. 2 shows an illustrative method for prioritized replication of a virtual world to bypass asset preloading in accordance with principles described herein.

As one example of functionality that processor 104 may perform, FIG. 2 shows an illustrative method 200 for prioritized replication of a virtual world to bypass asset preloading in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a server system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by system 100 (e.g., by processor 104 as processor 104 executes instructions 106 stored in memory 102).

At operation 202, system 100 may receive a request from a client device to join a virtual world. For example, system 100 may be implemented as a multi-access server (e.g., a MEC server system, a cloud-based multi-access server system, etc.) that provides services for a plurality of client devices including the client device and manages the virtual world. The virtual world managed by this multi-access server may be a multiuser virtual world that provides a space in which respective users of each of the client devices may enter, interact, and jointly experience the multiuser virtual world. The request received at operation 202 to join the virtual world may be provided by the client device in any suitable way such as by sending data representative of the request over a network by way of which system 100 and the client device are communicatively coupled.

At operation 204, system 100 may identify an avatar location in response to receiving the request at operation 202. The avatar location may be a location for an avatar that is to represent a user of the client device within the virtual world when the client device joins the virtual world. As such, the identifying of the avatar location at operation 204 may be performed by identifying a default location within the virtual world at which all avatars are located upon entering the world, a default location within the virtual world that is specific to the particular client device or user (e.g., a predetermined avatar location that the user has selected for his or her avatar to appear when entering the virtual world), a location that is indicated within data associated with the request of operation 202 or that is otherwise selected in connection with the request at the time that the client device joins the virtual world, or another suitable location within the virtual world that may be identified by default and/or based on user input as may serve a particular implementation. As will be described and illustrated in more detail below, the avatar location may be at least partially determinative of priority levels that will be assigned to different assets, since, for example, assets associated with virtual objects relatively proximate to the avatar location may be more immediately relevant to the user's experience as the client device joins the virtual world than assets associated with virtual objects relatively remote from the avatar location within the virtual world.

At operation 206, system 100 may determine respective priority values for various assets of the virtual world based on the avatar location identified at operation 204. In particular, system 100 may determine a first priority value for a first asset of the virtual world and a second priority value for a second asset of the virtual world. As will be described and illustrated in more detail below, assets of the virtual world (including the first and second assets in this example) may be virtual objects present within the virtual world or particular attributes of such objects (e.g., meshes, audio components, physics components, etc., for the virtual objects). In the example of method 200, the first priority value will be assumed to be higher than the second priority value. As such, the first asset will be understood to be considered more relevant (or more immediately relevant, as the client device joins the virtual world) to the user's experience than the second asset. For example, the first asset may be associated with a first virtual object that is more proximate to the avatar location than is a second virtual object with which the second asset is associated. As another example, the first asset may be associated with a first virtual object of an object type that is likely to have a greater impact on the user's experience (e.g., another avatar that user can talk to, etc.) than a second virtual object of a less impactful object type (e.g., an inanimate object that is simply present for decoration, etc.). As yet another example, the first asset may be associated with a first attribute of a virtual object that is more immediately relevant to the user's experience than is a second attribute of that virtual object associated with the second asset. For instance, a mesh or pose attribute of the virtual object that influences how and where the object is to be presented within the virtual world may be more immediately relevant to the user in being able to see the virtual object than a physics-related attribute of the object that influences how the user can interact with the object (e.g., whether the object is solid or can be passed through, etc.) because the user may not yet even be close enough to interact with the object in applicable ways (e.g., to try to touch or pass through the object, etc.).

At operation 208, system 100 may provide a prioritized replication of the virtual world to the client device based on the first and second priority values determined at operation 206. A prioritized replication of a virtual world involves replicating assets of a virtual world in a prioritized manner such that higher priority assets (e.g., highly relevant assets likely to significantly and/or immediately influence a user's experience) are replicated, and even presented, prior to the replication of lower priority assets (e.g., less relevant assets that are unlikely to significantly and/or immediately influence the user's experience). As such, the prioritized replication of the virtual world provided at operation 208 may be a replication in which the first asset (i.e., the asset with the higher priority value in this example) is replicated in a prioritized manner that allows the user to experience the first asset before the second asset (i.e., the asset with the lower priority value in this example) is replicated.

By preparing and providing the prioritized replication of the virtual world in the manner of method 200, system 100 may facilitate the client device in immediately presenting and updating the most relevant assets to the user even while less relevant assets continue to be replicated. To the user, this prioritized replication may be experienced as a virtual world that is built up before the user's eyes, starting with the closest virtual objects (which are immediately visible and interactable) and moving outward to virtual objects that are further away (and which the user cannot see as well). Additionally, various aspects of the prioritized replication may not be perceivable by the user since these aspects relate to object attributes that are not immediately apparent to the user (e.g., physics attributes by objects too far away interact with, audio originated by object too far away to hear, etc.). As described above, this prioritized replication may bypass asset preloading requirements of conventional replication models by allowing certain assets to be presented within the virtual world prior to other assets even being replicated. This technique may be advantageous for users who would rather immediately see and interact with high-priority assets while low-priority assets continue to be replicated, rather than having to wait for all the assets of the virtual world to preload before any asset is presented or becomes interactable.

Figure 3:
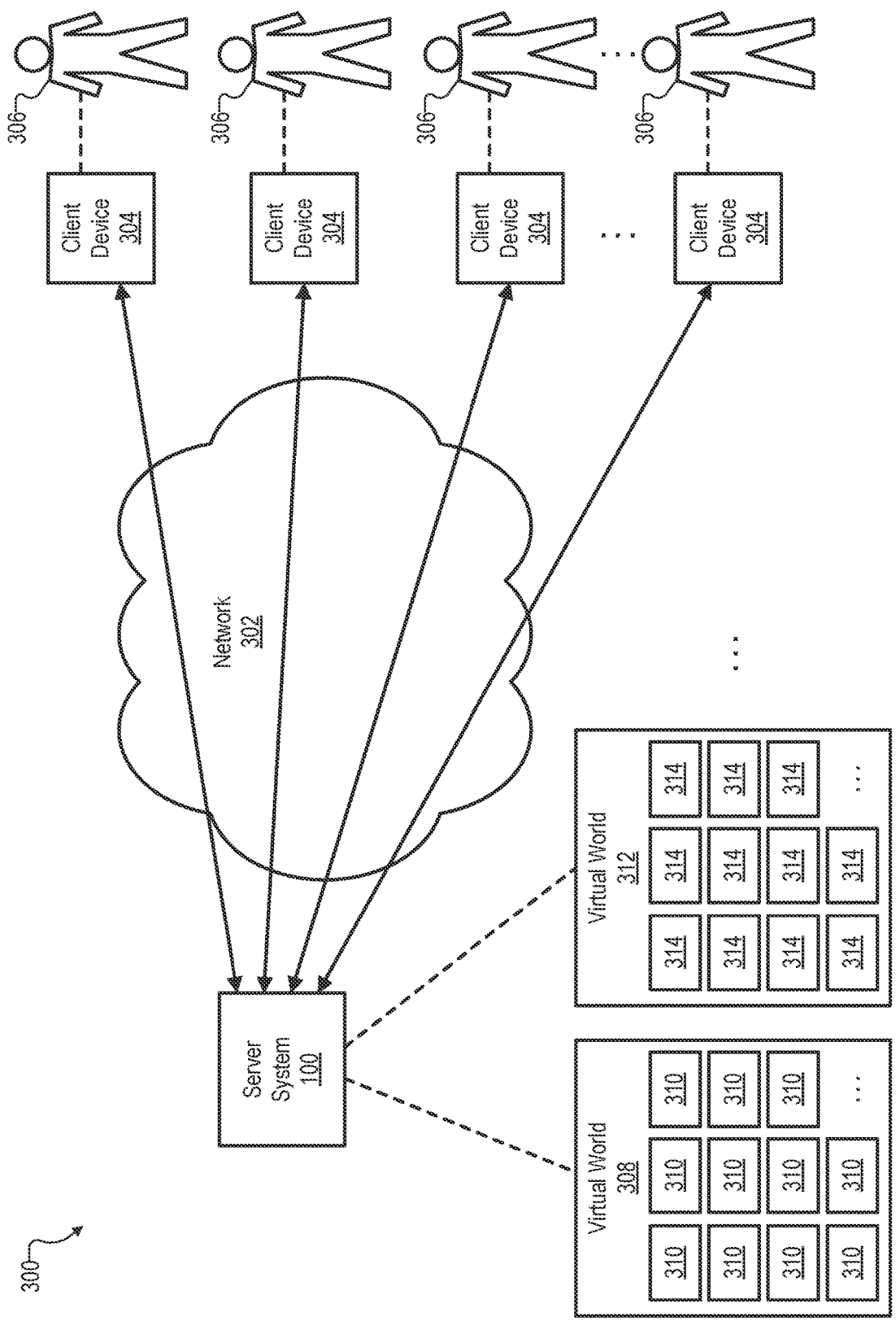
FIG. 3 shows an illustrative configuration in which the server system of FIG. 1 may operate to provide prioritized replication of a virtual world in accordance with principles described herein.

FIG. 3 shows an illustrative configuration 300 in which system 100 may operate to provide prioritized replication of a virtual world in accordance with principles described herein. As shown, system 100 is communicatively coupled, by way of a network 302, to a plurality of client devices 304 that are used by respective users 306. More particularly, system 100 is implemented on a server-side of a server-client architecture enabled by network communications over network 302, while client devices 304 are implemented as clients served by system 100 within this architecture.

Network 302 enables this server-client architecture by allowing various types of system 100 implementations (e.g., cloud-based implementations, MEC-based implementations, etc.) to communicate with various types of client devices 304 pursuant to operations of method 200 described above and/or other processes and techniques described herein. For example, network 302 may enable communication of the request of operation 202, the asset data of the prioritized replication of operation 208, and so forth. To this end, network 302 may include any network or networks configured to transport data between endpoints such as system 100, one or more client devices 304, and/or other devices or systems as may be present in a particular implementation. In some examples, network 302 may include or be associated with a local area network, a wide area network, or the Internet. Additionally, network 302 may include a provider network such as a cellular data network (e.g., a 5G network or data network of another suitable generation) that is managed by a service provider such as a telecommunications service provider (e.g., a cellular service provider), an application service provider, a storage service provider, an internet service provider, or the like.

Client devices 304 may be implemented as any suitable computing devices configured to present virtual worlds and support user experiences within those worlds (e.g., viewing the worlds, interacting within the worlds, etc.) in any way as may serve a particular implementation. For instance, certain client devices 304 may be implemented by handheld mobile devices (e.g., general-purpose mobile devices such as smartphones or tablet devices), other client devices 304 may be implemented by head-mounted XR presentation devices (e.g., head-mounted VR or AR presentation devices, standard mobile devices mounted in front of the eyes by an apparatus, etc.), and still other client device 304 may be implemented by laptop or desktop computers or other types of UE devices as may serve a particular implementation. In certain examples, a display device (e.g., a head-mounted display, a handheld screen, etc.) may be integrated with processing resources of a client device 304 within a single enclosure. In other examples, processing and display operations may be performed by different devices or different components of a single device (e.g., a handheld component tethered to a head-mounted component, etc.).

System 100 may be implemented as any computing device or group of computing devices that provide graphical and/or audio content (e.g., virtual world content, assets associated with a virtual world, etc.), as well as metadata and/or other information, to client devices 304. For example, system 100 may be implemented in some examples as a cloud-based server system connected to network 302, while in other examples system 100 may be implemented as a MEC-based server system operating within network 302 (e.g., on the edge of the provider network within a network element such as a radio access network, a transport access point, a service access point, or another such element of the provider network). While a cloud-based server system may take advantage of certain economies of scale (along with associated efficiencies and other advantages associated therewith) that may not be available for MEC-based systems, MEC-based systems may be configured to provide more responsive computational support to client devices 304. For example, latencies of tasks performed by MEC-based implementations of system 100 may be significantly lower than latencies of tasks performed by cloud-based implementations. In certain examples, system 100 may be implemented by a combination of cloud-based and MEC-based computing resources to allow for performance of different types of tasks (e.g., tasks prioritizing processing efficiencies, tasks prioritizing low-latency responsiveness, etc.) to be optimized according to the different strengths of these types of systems.

Users 306 may each direct their respective client devices 304 to join one or more virtual worlds managed by system 100. In this way, users 306 may jointly experience these virtual worlds by way of respective avatars having unique avatar locations and fields of view within the virtual worlds. To facilitate and enable presentation of such user experiences within the virtual worlds, system 100 may prepare and provide prioritized replication of virtual worlds that system 100 manages. To illustrate, system 100 is shown to manage a first virtual world 308 that includes a plurality of assets 310 and a second virtual world 312 that includes a plurality of assets 314. Ellipsis in FIG. 3 indicate that, while several assets 310 and 314 are explicitly represented as labeled boxes within their respective virtual worlds, various other assets not explicitly represented may also be understood to be included in these virtual worlds. Similarly, as illustrated by an ellipsis next to virtual world 312, it will be understood that system 100 may manage additional virtual worlds other than virtual worlds 308 and 312.

Similar to dashed lines connecting each individual client device 304 to its respective user 306, dashed lines connecting system 100 to virtual worlds 308 and 312 will be understood to illustrate a correspondence relationship between these entities (rather than, for example, a communicative relationship such as illustrated by the double-sided solid arrows connecting system 100 to client device 304). For example, the dashed lines may be understood to indicate that virtual worlds 308 and 312 are represented by data that is managed by system 100 (e.g., stored, organized, and/or otherwise maintained within memory 102 by way of operations directed by instructions 106 to be performed by processor 104) and that is to be replicated, upon request, to client devices 304 that join the virtual worlds.

Virtual worlds 308 and 312 may each represent any types of virtual worlds as have been described or as may serve a particular implementation. For instance, these virtual worlds may be implemented by different levels of a 3D video game, by different virtual reality environments of a virtual reality application, by different channels of an XR streaming application (e.g., a streamed VR basketball game on one channel, a streamed VR jungle adventure on another channel, etc.), by different sections of a virtual office space (e.g., corresponding to different virtual floors of an office building, to different departments of a company using the virtual office space, etc.), or by any other suitable virtual worlds as may serve a particular implementation.

Assets 310 of virtual world 308 and assets 314 of virtual world 312 may be provided to client devices 304 in accordance with prioritized replication methods and principles described herein (e.g., including method 200 described above and additional principles that will be described in more detail below). In this way, prioritized replication of virtual worlds 308 and 312 may be said to be provided to these client devices 304 in a way that bypasses asset preloading and provides the various benefits and advantages described herein.

A particular client device 304 may join a particular virtual world (e.g., virtual world 308) and begin immediately presenting replicated assets to the user 306 (e.g., even as other assets are still be replicated). Subsequently, after leaving that world (or while remaining logged into that world in certain examples that support avatars concurrently inhabiting a plurality of virtual worlds), the client device 304 may join a different virtual world (e.g., virtual world 312) that is also immediately presented in accordance with principles of prioritized replication described herein. More particularly, for example, after performing operations 202-208 with respect to a particular client device 304 and virtual world 308 (e.g., subsequent to commencement of the prioritized replication of virtual world 308 at operation 208), system 100 may proceed to perform additional operations including: 1) receiving a second request from the client device 304 to leave virtual world 308 (optional) and join virtual world 312 (i.e., a second virtual world managed by system 100); 2) determining, in response to receiving the second request, respective priority values for a plurality of assets 314 of virtual world 312; and 3) providing a prioritized replication of virtual world 312 to the client device 304 based on the respective priority values for the plurality of assets 314.

As mentioned above, system 100 may be implemented by an individual computing device (a single server, etc.) or by a collection of computing devices that interoperate to implement the operations described herein to be performed by system 100. Accordingly, it will be understood that, in certain examples, an individual computing device may manage more than one virtual world and a client device exiting one virtual world and joining another may continue communicating with the same computing device. In other examples, however, different computing devices (e.g., different server devices implementing server system 100) may each manage one virtual world such that, to exit virtual world 308 and join virtual world 312 as described in the example above, the particular client device 304 may cease communicating with one server device within system 100 and begin communicating with another server device within system 100.

Virtual world assets such as assets 310 and/or 314 in FIG. 3 may be implemented as any type of assets described herein. For instance, as one example, each asset may be a virtual object present in the virtual world. Referring to the first and second assets recited in method 200 above, for example, the first asset of the virtual world may be a first virtual object present in the virtual world and the second asset of the virtual world may be a second virtual object present in the virtual world. To illustrate this type of implementation in which each object is treated as a separate asset, FIG. 4 shows different views of an illustrative virtual world that includes several illustrative virtual objects implementing assets of the virtual world and FIG. 5 shows aspects of an illustrative priority queue that is used to manage priority replication of a virtual world with these types of assets.

Figure 5:
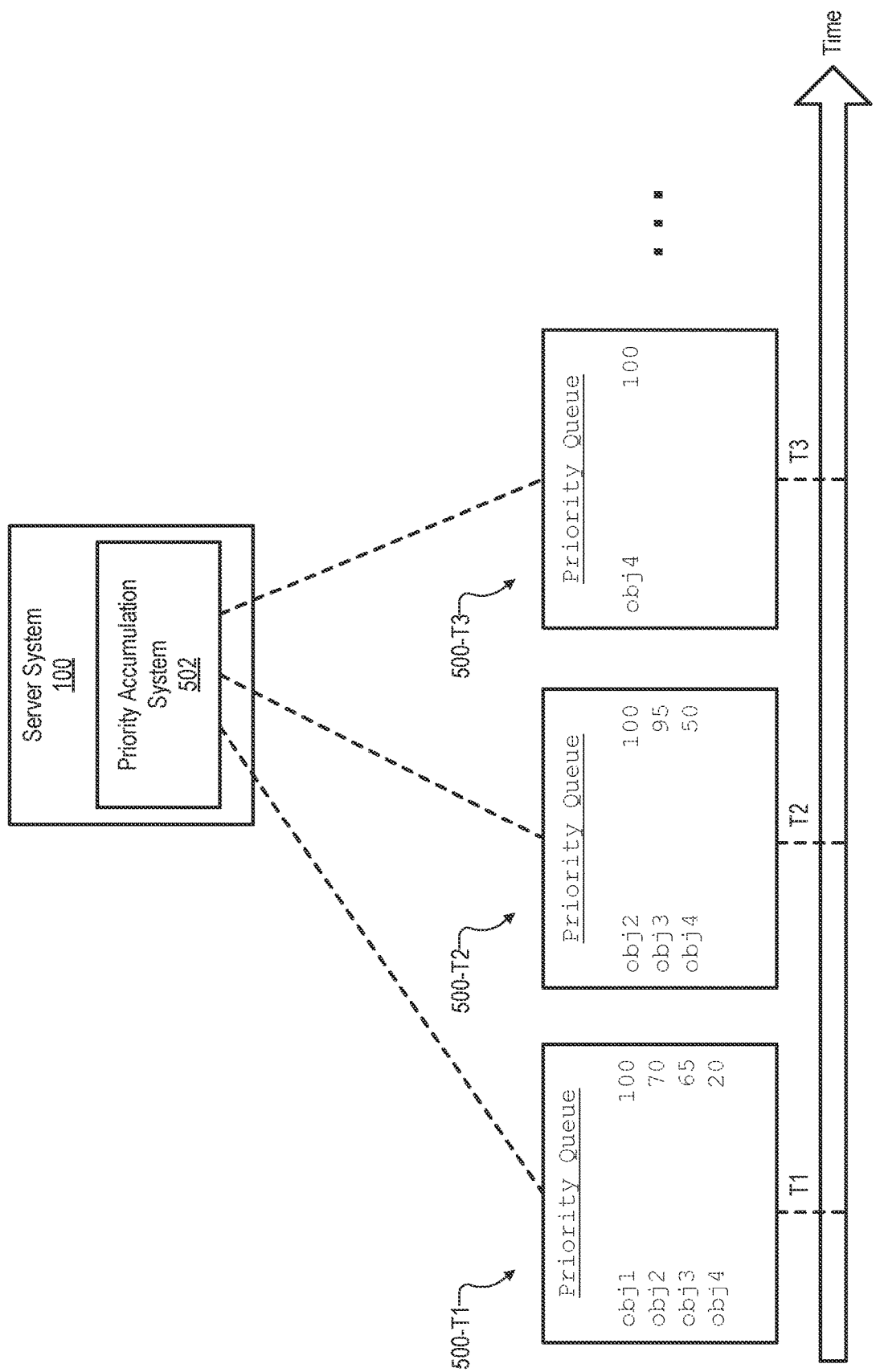
FIG. 5 shows illustrative snapshots at several points in time of an illustrative priority queue managed by a priority accumulation system in accordance with principles described herein.
Figure 6:
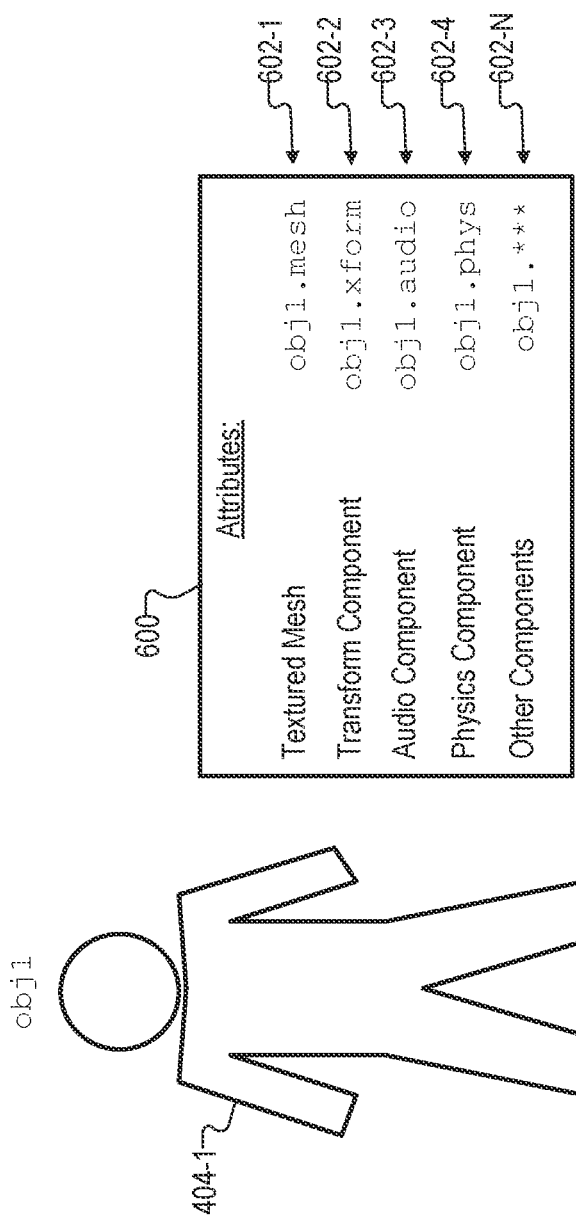
FIG. 6 shows illustrative assets of a virtual world that include an illustrative virtual object and example attributes of the virtual object in accordance with principles described herein.
Figure 7:
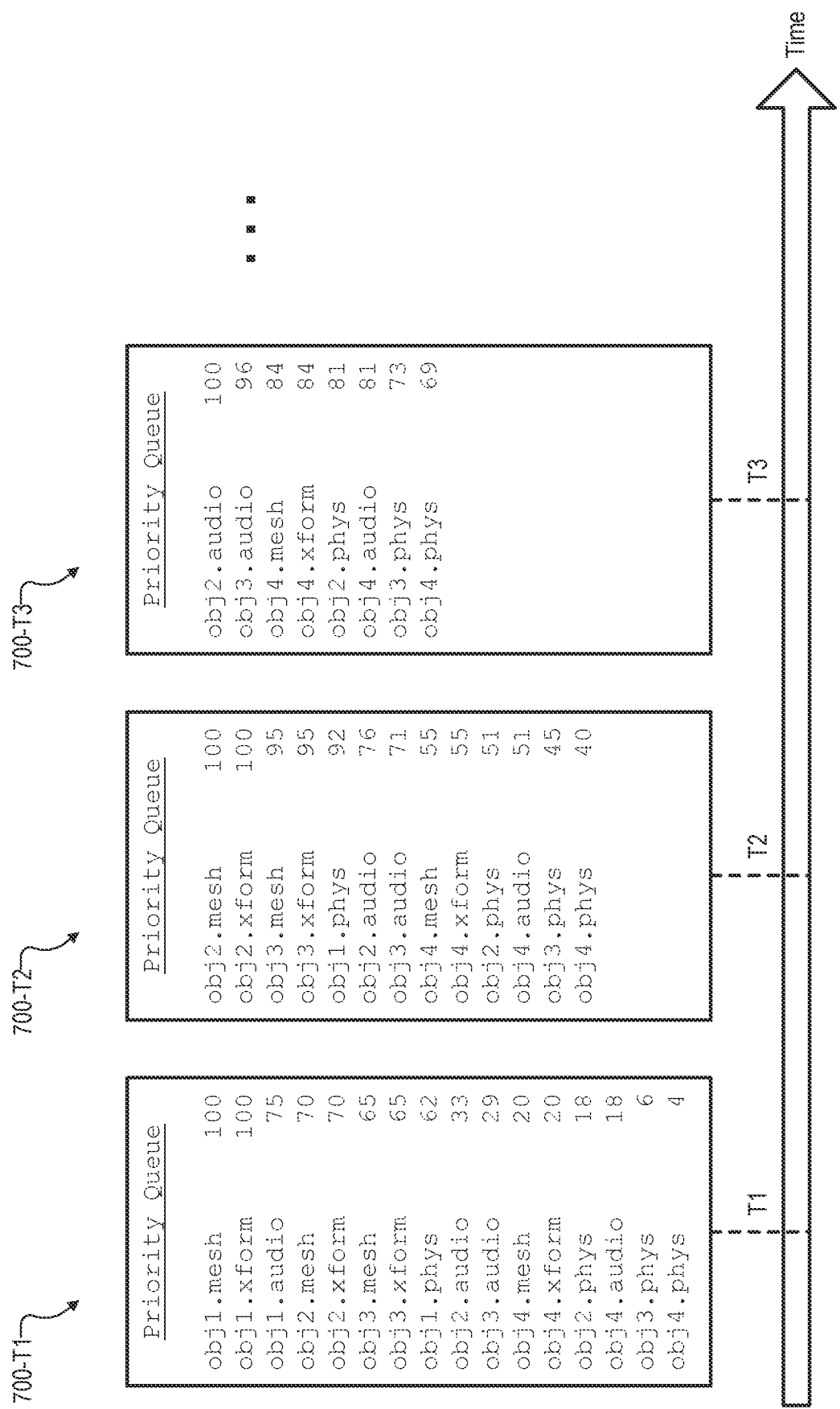
FIG. 7 shows illustrative snapshots at several points in time of another illustrative priority queue managed by a priority accumulation system in accordance with principles described herein.

As another example of how virtual world assets such as assets 310 and/or 314 may be implemented, assets may represent attributes of virtual objects in the virtual world. Referring again to the first and second assets recited in method 200 above, for example, the first asset of the virtual world may be a first attribute of a virtual object present in the virtual world and the second asset of the virtual world may be a second attribute of the virtual object. To illustrate this type of implementation in which different attributes of each object are treated as separate assets, FIG. 6 shows illustrative assets that include example attributes of a virtual object and FIG. 7 shows aspects of an illustrative priority queue that is used to manage priority replication of a virtual world with these types of assets. FIGS. 4-7 will now be described in more detail.

Figure 4:
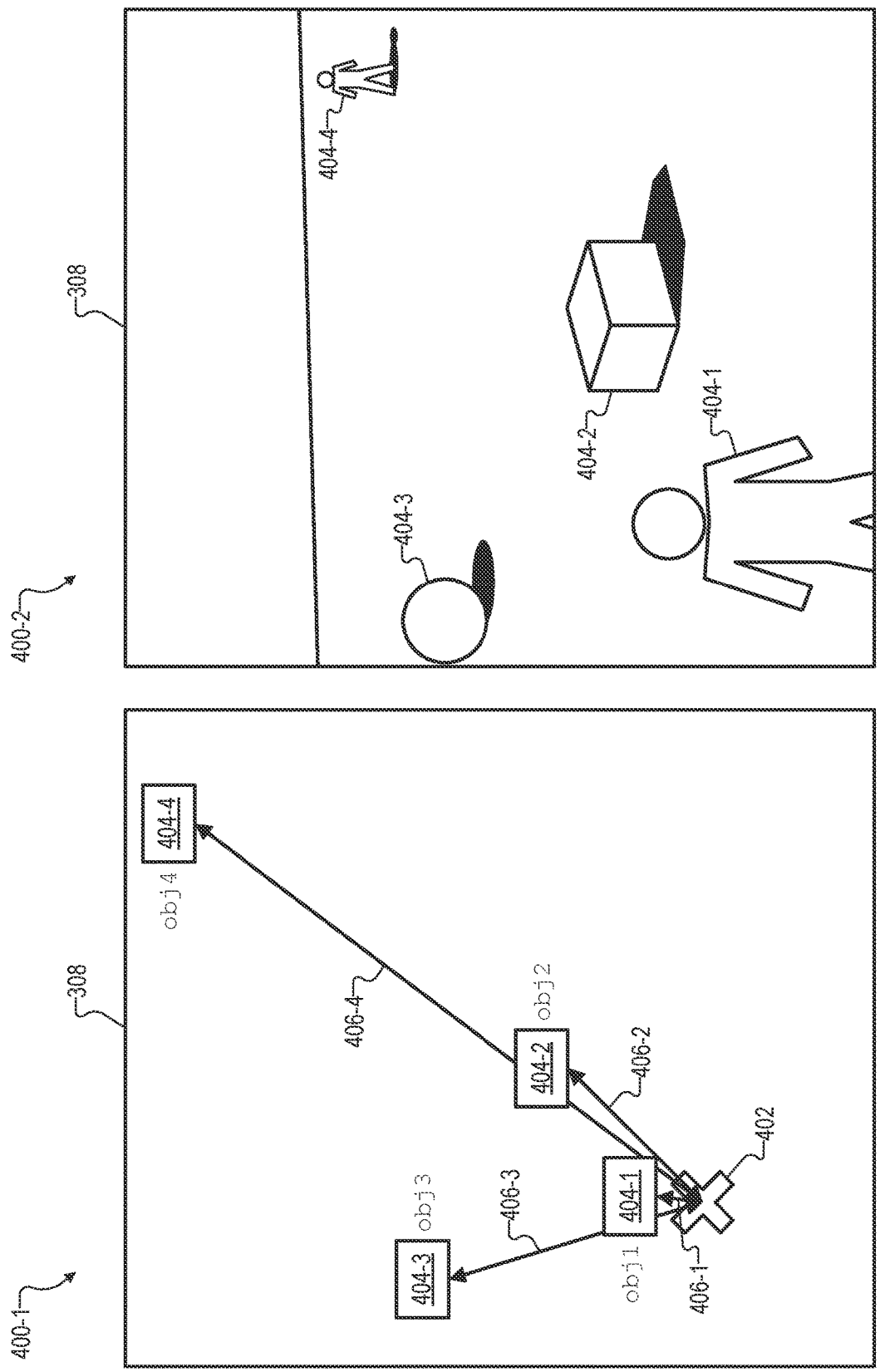
FIG. 4 shows different views of an illustrative virtual world that includes several illustrative virtual objects in accordance with principles described herein.

FIG. 4 shows different views 400 (i.e., views 400-1 and 400-2) of an implementation of virtual world 308 that is managed by system 100, as described above. Specifically, view 400-1 of virtual world 308 shows a schematic view of the virtual world that includes an avatar location 402 depicted with an 'X' symbol and includes several illustrative virtual objects 404 (virtual objects 404-1 through 404-4) located at different locations within the virtual world. For reference in later figures, each virtual object 404 is labeled with token in a monospaced (i.e., fixed-width) font to indicate a short name (i.e., "obj1" for virtual object 404-1, "obj2" for virtual object 404-2, etc.). These tokens will be used to refer back to the virtual objects in later figures. In this example, individual virtual objects 404 are each considered to be different assets of virtual world 308 (i.e., corresponding to assets 310).

Avatar location 402 may represent either the location at which an avatar representative of a user joining virtual world 308 is initially located (in the case that view 400-1 shows virtual world 308 at the initial moment when the user joins) or the location at which the avatar has come to be located after moving around within the virtual world (in the case that view 400-1 shows virtual world 308 at a moment in time after the user joins and has moved around within the world). In either case, it will be understood that the avatar representing the user within virtual world 308 may be located at avatar location 402 and, as such, one aspect of how relevant virtual objects 404 are considered to be to the user is directly proportional to their respective proximities to avatar location 402. For example, a short distance 406-1 between avatar location 402 and virtual object 404-1 indicates that virtual object 404-1 is relatively proximate to the avatar and thus relatively important to the user's experience at avatar location 402. In contrast, distances 406-2, 406-3, and 406-4 are shown to be progressively longer distances such that the virtual objects 404 to which they correspond (i.e., virtual objects 404-2, 404-3, and 404-4, respectively) are considered to be progressively less relevant to the user's experience in this example. It will be understood that other priority criteria in a set of predefined priority criteria (e.g., the likely impact of different types of objects or other criteria besides proximity to the avatar location) may be accounted for in addition and/or as an alternative to this proximity criterium that has been described.

To illustrate the comparative relevance of each of virtual objects 404, view 400-2 of virtual world 308 shows a perspective view that the user may see from avatar location 402 while experiencing virtual world 308. As shown, virtual object 404-1 is another avatar (or another character entity such as a non-player character) that is standing nearby avatar location 402 (e.g., perhaps to communicate face to face with the user by way of his or her avatar), virtual object 404-2 is a box-shaped object that is nearby but a little farther from the avatar, virtual object 404-3 is a spherical object that is farther still from the avatar, and virtual object 404-4 is another avatar (or other character entity) that is relatively remote from avatar location 402 (e.g., too far away to communicate with easily or even to be seen in detail from the user's vantage point at avatar location 402).

As described above, different priority values for various assets of the virtual world may be determined based on the avatar location and/or other priority criteria in a set of predefined priority criteria that includes proximity to the avatar location, likely impact to the user experience of a particular object type (e.g., reflecting that other avatars may be more important to the user than decorative or other objects even if the decorative object are more proximate to the avatar location), and so forth. For a given set of predefined priority criteria, system 100 may determine that one virtual object satisfies the set of predefined priority criteria to a greater degree than another virtual object satisfies the set of predefined priority criteria. As such, priority values for each of these objects may be based on this determination as well.

As one example, the respective distances 406 between avatar location 402 and assets associated with virtual objects 404 may be used to determine priority values for each virtual object 404. For instance, a relatively short distance 406 (indicative of a close proximity of a virtual object 404 to avatar location 402) may cause a relatively high priority value to be determined for that virtual object 404 since the object may be more easily observable and readily accessible (e.g., for interacting with the object) to the avatar at avatar location 402. In contrast, a relatively long distance 406 (indicative of relative remoteness of a virtual object 404 to avatar location 402) may cause a relatively low priority value to be determined for that virtual object 404 since the object may be less likely to be noticed and/or interacted with (a background object) for the avatar at avatar location 402. Likewise, objects of certain types that are likely to have a meaningful impact on user experience (e.g., other avatars, etc.) may be assigned relatively high priority values while objects of other types less likely to meaningfully impact the user experience (e.g., decorative inanimate objects, etc.) may be assigned relatively low priority values.

Referring to two specific virtual objects associated with two specific assets (virtual objects 404-1 and 404-2, for instance), system 100 may determine that the first virtual object implementing the first asset (e.g., virtual object 404-1) is both more proximate than the second virtual object implementing the second asset (e.g., virtual object 404-1) to the avatar location (e.g., avatar location 402) as well as a more impactful type of object (another avatar rather than an inanimate object). Consequently, the determining of the first and second priority values (e.g., at operation 206 of method 200) may be based, in this example, on the determining that the first virtual object is more proximate than the second virtual object to the avatar location and/or the determining that the first virtual object is more likely to impact the user experience than the second virtual object.

FIG. 5 shows illustrative snapshots at several points in time of an illustrative priority queue 500 managed by a priority accumulation system 502 implemented by system 100. Specifically, a first snapshot at time T1 along a timeline ("Time") is labeled as priority queue 500-T1, a second snapshot at time T2 along the timeline is labeled as priority queue 500-T2, and a third snapshot at time T3 along the timeline is labeled as priority queue 500-T3.

Priority accumulation system 502 may be implemented by resources within system 100 (e.g., a software utility that uses processor 104 and memory 102, etc.) and may be configured to perform the determining of the priority values for each asset that is to be replicated by system 100. As shown in each priority queue snapshot, assets implemented by different virtual objects 404 (labeled respectively as obj1-obj4 consistent with the labels shown and described in relation to view 400-1 of FIG. 4) are each assigned a particular priority value. For example, at time T1, virtual object 404-1 (obj1) is assigned a priority value of 100 as a result of its close proximity to avatar location 402 (i.e., based on the short length of distance 406-1 in relation to the lengths of other distances 406). For this same point in time, virtual object 404-2 (obj2) is assigned a priority value of 70 and virtual object 404-3 (obj3) is assigned a priority value of 65, reflecting their respective distances 406-2 and 406-3 that are longer than distance 406-1 and similar to one another. Virtual object 404-4 (obj4) is assigned a low priority value of 20 at time T1 due to its relatively long distance 406-4 from avatar location 402. As a consequence of these priority values, a user experiencing virtual world 308 from avatar location 402 may have to wait longer to see and/or interact with the avatar implemented by virtual object 404-4 than for the avatar implemented by virtual object 404-1, but the wait occasioned by this asset prioritization is acceptable since the avatar of virtual object 404-4 is so much farther away, harder to see in detail, less likely to be interacted with, and so forth, than the avatar of virtual object 404-1.

While priority values are represented as integers between 0 (lowest priority) and 100 (highest priority) in the example of FIG. 5 and other examples illustrated herein, it will be understood that priority values may be determined, assigned, and implemented in any form or format as may serve a particular implementation. For instance, floating point values between 0 and 1 may be used as priority values in certain implementations, a relatively small number of discrete levels (e.g., "high priority," "medium priority," and "low priority" levels, etc.) may be assigned as priority values in other implementations, and other suitable types of values may be relied on in still other implementations.

After determining initial priority values for each asset at time T1 (priority queue 500-T1), priority accumulation system 502 may further be configured to track updates to the priority values as the prioritized replication of assets proceeds. For example, as system 100 replicates the higher-priority assets to the client device, lower-priority assets may increase in priority and move up the list. This is shown as priority queue 500 progresses over time from T1 to T3. For instance, virtual object 404-4 (obj4) is shown to progress from a low priority value of 20 at time T1 to a medium priority value of 50 at time T2 to a high priority value of 100 at time T3.

While priority accumulation system 502 is shown to determine progressively lower priority values as the distance from avatar location 402 increases (i.e., the priority value decreasing for an expanding radius around avatar location 402), it will be understood that priority accumulation system 502 may also account for other factors besides the distance 406 associated with a particular asset while determining a priority value for that asset. As one example, for instance, a size of the virtual object an asset is associated with may be accounted for (since large objects may be easier to see even if they are far away and small objects may reveal less detail even when they are close). As another example, an orientation of the avatar at avatar location 402 may be accounted for such that, all else being equal, higher priority values are assigned to assets associated with virtual objects that are included within a field of view of the avatar and lower priority values are assigned to assets associated with virtual objects that are outside of the field of view of the avatar. In some examples, the priority values may be assigned dependent on an angular distance of the objects from the center of the field of view, such that, all else being equal, objects near the center of the field of view are assigned the highest priority values, objects just outside the field of view are assigned lower priority values, and object far outside the field of view are assigned even lower priority values.

In certain implementations or particular circumstances, an asset may be associated with a virtual object and all the attributes thereof. For instance, it may be desirable that system 100 treat virtual object 404-1 to be more relevant than virtual object 404-4 in every respect (e.g., due to the closer proximity of virtual object 404-1 to avatar location 402), such that the relatively simple priority queue illustrated in FIG. 5 in which each asset is a complete virtual object is appropriate. As will now be described in more detail, however, it may also be desirable in other implementations or other particular circumstances for assets to correspond to virtual objects in a manner that allows for more flexibility and granularity of the replication process. For example, rather than an asset corresponding to an entire virtual object 404 such as described in relation to FIGS. 4 and 5, an asset of a virtual world may instead correspond to just a particular attribute of a virtual object 404. In this way, certain attributes that are deemed to be more relevant to a user's experience (e.g., how a virtual object looks, where the virtual object is located, etc.) may be replicated with higher priority than other attributes that may be less relevant (e.g., sound that is originating from the virtual object, physical properties of the virtual object such as how the object should behave when touched, etc.).

FIG. 6 shows illustrative assets of this type. Specifically, in this example, a list 600 of attributes 602 (attributes 602-1 through 602-N) for a particular virtual object (virtual object 404-1 or "obj1") is shown to implement assets 310 of virtual world 308. While each asset 310 was described as corresponding to complete a virtual object 404 in FIGS. 4 and 5, examples will now be presented in which assets 310 correspond to individual attributes 602 of the virtual objects. Specifically, referring to the first and second assets recited in method 200 of FIG. 2, FIG. 6 introduces an example in which the first asset of the virtual world is a first attribute of a virtual object present in the virtual world (e.g., virtual object 404-1) and the second asset of the virtual world is a second attribute of the virtual object.

The attributes of virtual object 404-1 in list 600 may include or relate to any suitable properties, traits, qualities, aspects, features, components, or other characteristics of virtual object 404-1. To illustrate a few examples, a first attribute 602-1 of virtual object 404-1 is shown to be a textured mesh for the virtual object. The textured mesh may define an appearance of virtual object 404-1 and a geometric volume of space occupied by the virtual object within virtual world 308. For example, the textured mesh may include a spatial volume constructed from a plurality of interconnecting geometric shapes (e.g., triangles) that form a surface of the virtual object that is textured using image data. In the example of a human avatar such as virtual object 404-1, the mesh may implement a 3D human form (e.g., with a head, torso, arms, legs, etc.) and the texture may depict skin, hair, clothing, and so forth, to give the textured mesh the desired appearance for the human avatar. The textured mesh implementing attribute 602-1 may be represented by any suitable data such as image data for the textures, geometric point data corresponding to vertexes of the shapes implementing the mesh, and so forth. As shown in FIG. 6, textured mesh attribute 602-1 is labeled with a token in a monospace font to indicate both the object ("obj1") that attribute 602-1 is associated with and the nature of the attribute ("mesh"). This token will be used below to refer back to the textured mesh attribute 602-1.

A second attribute 602-2 of virtual object 404-1 is shown to be a transform component for the virtual object. The transform component may define a position, orientation, and/or scale of the virtual object within virtual world 308. For example, the transform component may include coordinates, transform vectors, size indicators, and/or any other data as may be used to indicate where within the virtual world virtual object 404 is to be located, how virtual object 404 is to be oriented, and how large or small virtual object 404 is to be rendered. In the example of a human avatar such as virtual object 404-1, the transform component may indicate the coordinates within virtual world 308 at which the avatar is to be located, the pose of the avatar at that location, the size and scale of the avatar, and so forth. In certain examples, the transform component may also include additional information beyond the position, orientation, and/or scale of the virtual object. For instance, certain transform components may indicate hierarchical information regarding virtual objects within the scene. Such information may be used, for example, when one object moves, rotates, scales, or otherwise changes and thereby causes one or more other objects (e.g., objects in a parent-child or other hierarchical relationship) to likewise change. As shown in FIG. 6, transform component attribute 602-2 is labeled with a token in a monospace font to indicate both the object ("obj1") that attribute 602-2 is associated with and the nature of the attribute ("xform"). This token will be used below to refer back to the transform component attribute 602-2.

A third attribute 602-3 of virtual object 404-1 is shown to be an audio component for the virtual object. The audio component may define virtual sound that is to be simulated as originating from the virtual object within virtual world 308. For example, the audio component may include audio data, metadata (e.g., textual subtitles associated with speech, etc.), and/or any other data as may be used to represent sound that originates from virtual object 404. In the example of a human avatar such as virtual object 404-1, the audio component may represent speech or other sounds provided by a user of the avatar, such as audio communication that the user wishes to transmit to other users represented by other avatars in the virtual world. As shown in FIG. 6, audio component attribute 602-3 is labeled with a token in a monospace font to indicate both the object ("obj1") that attribute 602-3 is associated with and the nature of the attribute ("audio"). This token will be used below to refer back to the audio component attribute 602-3.

A fourth attribute 602-4 of virtual object 404-1 is shown to be a physics component for the virtual object. The physics component may define a physical property determinative of how the virtual object behaves with respect to the virtual world or other virtual objects within the virtual world. For example, the physics component may define whether the object is solid (e.g., so as to uniquely occupy a space in the virtual world similar to a solid object in the real world) or incorporeal (e.g., such that other objects may freely occupy the same space such as would be the case for a hologram or cloud in the real world), how massive the object is (e.g., how easily it may be moved, if at all), how the object behaves when encountering other objects (e.g., whether it bounces when dropped, whether it is damaged or remains resilient when hit by objects such as bullets, etc.), and so forth. As shown in FIG. 6, physics component attribute 602-4 is labeled with a token in a monospace font to indicate both the object ("obj1") that attribute 602-4 is associated with and the nature of the attribute ("phys"). This token will be used below to refer back to the physics component attribute 602-4.

Attributes 602-1 through 602-4 are provided as examples only, and it will be understood that list 600 may include different attributes 602 or additional attributes (represented by attributes 602-N) to fully define various aspects of virtual object 404-1 as may serve a particular implementation.

FIG. 5 illustrated how priority values may be determined for assets implemented as virtual objects based on the proximity of the virtual objects to the avatar location. For assets implemented as individual attributes such as illustrated in FIG. 6, however, it will be understood that the nature of the attributes may also be accounted for (along with the proximity of the virtual objects) in determining the priority value of each asset. For instance, certain types of attributes (e.g., a textured mesh attribute, a transform component attribute, etc.) for a given object may be considered to be higher priority for replication than other types of attributes (e.g., an audio component attribute, a physics component attribute). Moreover, between different virtual objects, it may be the case that certain attributes of a first object may be higher priority than certain attributes of a second object while being lower priority than other attributes of the second object.

A few specific examples of how system 100 (a priority accumulation system included within system 100) may determine priority values for attribute-based assets such as attributes 602 will now be provided. In one specific example, a first asset of the virtual world is a textured mesh for a virtual object present in the virtual world (e.g., attribute 602-1 of virtual object 404-1) and a second asset of the virtual world is an audio component for the virtual object (e.g., attribute 602-3 of virtual object 404-1). In this example, the object appearance indicated by the textured mesh may be considered to be a higher priority for replication than the audio indicated by the audio component, and, as such, system 100 may determine the first priority value for the first asset to be higher than the second priority value for the second asset based on the first asset being the textured mesh for the virtual object and the second asset being the audio component for the virtual object.

As another specific example, a first asset of the virtual world is a transform component for a virtual object present in the virtual world (e.g., attribute 602-2 of virtual object 404-1) and a second asset of the virtual world is a physics component for the virtual object (e.g., attribute 602-4 of virtual object 404-1). In this example, the object location, orientation, and size indicated by the transform component may be considered to be a higher priority for replication than the physical properties indicated by the physics component, and, as such, system 100 may determine the first priority value for the first asset to be higher than the second priority value for the second asset based on the first asset being the transform component for the virtual object and the second asset being the physics component for the virtual object.

To illustrate attribute prioritization principles in operation, FIG. 7 shows illustrative snapshots at several points in time of an illustrative priority queue 700 that will be understood to be managed by a priority accumulation system of system 100 (similar to priority accumulation system 502 described above but not explicitly shown in FIG. 7). Specifically, similar to priority queue 500 described above in relation to FIG. 5, FIG. 7 labels a first snapshot at time T1 along a timeline ("Time") as priority queue 700-T1, a second snapshot at time T2 along the timeline as priority queue 700-T2, and a third snapshot at time T3 along the timeline as priority queue 700-T3.

In each snapshot of priority queue 700, different attributes ("mesh," "xform," "audio," and "phys") for different virtual objects 404 ("obj1," "obj2," "obj3," and "obj4") are each assigned different priority values that change over time as the prioritized replication takes place. These priority values reflect the higher priority of attributes such as textured mesh and transform component attributes and lower priority of attributes such as audio component and physics component attributes for each object, as has been described. For example, for virtual object 404-1 (obj1), the snapshot at time T1 (priority queue 700-T1) indicates that the textured mesh and transform component attributes (obj1.mesh and obj1.xform) are each assigned priority values of 100 (the highest priority), while the audio component attribute (obj1.audio) is assigned a priority value of 75 and the physics component attribute (obj1.phys) is assigned a priority value of 62 (indicating that these are not considered to be as important as the textured mesh and transform component attributes).

As further shown in priority queue 700-T1, while certain attributes of a relatively proximate virtual object such as virtual object 404-1 are of the highest priority, other attributes of the same virtual object are considered to be lower priority than high priority attributes of less proximate virtual objects. For example, as shown, the textured mesh and transform component attributes of both virtual objects 404-2 and 404-3 (obj2.mesh, obj2.xform, obj3.mesh, and obj3.xform) are all assigned priority values greater than the priority value of the physics component attribute of virtual object 404-1 (obj1.phys) even though virtual objects 404-2 and 404-3 are both less proximate to avatar location 402 than virtual object 404-1. These priority value assignments reflect a determination by the priority accumulator system that it is more relevant for the user to be able to see virtual objects 404-2 and 404-3 with their proper size, location, and orientation than it is for virtual object 404-1 to be imbued with all of its physical properties. It will be understood that the prioritization judgment inherent in this determination is illustrative only, and that other prioritization judgments may be implemented in other examples as may serve a particular embodiment or particular circumstances.

Similar to FIG. 5, FIG. 7 shows that as time passes from T1 to T3, priority queue 700 grows shorter as assets near the top are replicated and removed from the list and assets near the bottom move up in priority. Both of these examples reflect examples in which principles of prioritized replication described herein are employed for an initial replication of the virtual world to the client device. In these examples, it will be understood that the priority queue will eventually be emptied out as all the assets are initially replicated to the client device in the order prescribed by the priority values. In other examples, however, the same principles of prioritized replication of assets may be relied on not only for the initial replication of the virtual world, but also for updates to the virtual world as changes to assets occur (e.g., as objects move, physically interact with one another and with the world, originate different audio, etc.).

For example, system 100 may manage and maintain up-to-date versions of each asset over time. As different assets change (e.g., as users interact and direct their avatars to move and perform actions within the virtual world, etc.), system 100 may track these changes and manage a master version of each asset. In order to apprise each client device of changes made to the various assets in the virtual world after they have been loaded (e.g., changes to the location of avatars and other objects that have moved, new speech is being communicated, etc.), system 100 may continue to rely on a priority accumulator system managing a priority queue such as priority queue 500 or 700 to provide updated asset information in a prioritized manner.

For example, rather than being limited to the initial replication of each asset of a virtual world, the prioritized replication of the virtual world provided by system 100 may be made to include replicating each of the plurality of assets of the virtual world in both an initial phase and an update phase. The initial phase of the replicating of each asset may include transmitting initial data representative of the asset from the server system to the client device, while the update phase of the replicating of each asset may include transmitting (e.g., from system 100 to the client device and subsequent to the transmitting of the initial data) updated data representative of the asset and reflecting a change to the asset. In this example, both the initial phase and the update phase of the replicating of each asset may be performed in the prioritized manner based on respective priority values tracked by a priority accumulator system that tracks and updates the respective priority values for each asset.

Figure 8:
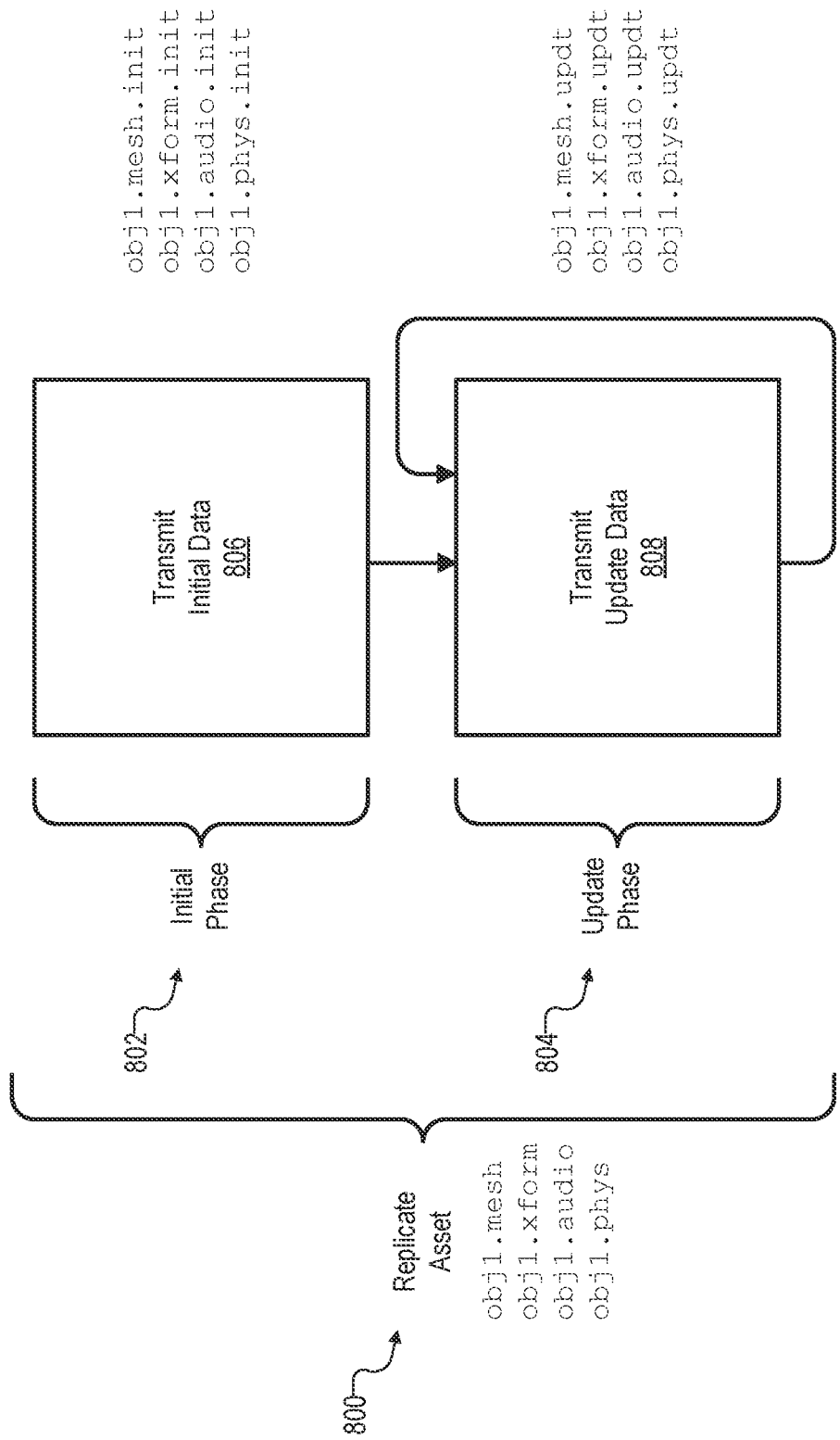
FIG. 8 shows illustrative phases in the replication of an asset of a virtual world in accordance with principles described herein.

To illustrate, FIG. 8 shows phases in the replication of an asset of a virtual world. Specifically, a prioritized replication 800 of any of various assets associated with virtual object 404-1 (obj1.mesh, obj1.xform, obj1.audio, or obj1.phys) is shown to incorporate both an initial phase 802 and an update phase 804. In initial phase 802, prioritized replication 800 involves an operation 806 in which initial data is transmitted for the asset. Similarly, in update phase 804, prioritized replication 800 involves an operation 808 in which update data is transmitted for the same asset. As indicated by the arrows between operations 806 and 808, operation 806 may be performed initially for a given asset, while operation 808 may be performed repeatedly (e.g., continually) as the asset changes and requires updating.

Tokens for each of various illustrative attributes are shown in the monospaced font to represent operation of initial phase 802 ("init") and operation of update phase 804 ("updt") for each attribute. Specifically, tokens are shown for each attribute of virtual object 404-1 to allow representation of these attributes being queued up both for their initial replication ("obj1.mesh.init," "obj1.xform.init," "obj1.audio.init," and "obj1.phys.init") and for their data to be updated ("obj1.mesh.updt," "obj1.xform.updt," "obj1.audio.updt," and "obj1.phys.updt").

Initial data and/or update data for various assets may be transmitted pursuant to operations 806 and 808 on a frame-by-frame basis or in another suitable way. For example, based on the bandwidth that is available for communication transfer (e.g., based on capabilities of the particular implementation of system 100, the network 302, the client device 304 to receive the transmission, etc.), data may be serialized and organized into frames (e.g., data packets, sets of packets, etc.) that are transmitted over the network to the client device. In certain examples, data frames may be sent at a consistent frame rate such that each instance of asset data (whether representing an initial asset or an update to an asset) can be scheduled for transmission as part of a particular frame based on the assigned priority value of that instance of asset data. In some examples, each frame may have a predefined size (or a maximum size limit) that may be accounted for in scheduling asset data transfer. For example, if one instance of asset data is too big to fit on a frame that is about to be transmitted, that asset data may be scheduled for the next frame while a lower-priority but smaller instance of asset data that fits on the first frame may be included.

Frame sizes and rates for transmitted frames of asset data may be static in certain implementations while being adaptive to network conditions in other implementations. The frame sizes and rates may be any suitable sizes and/or rates as may serve a particular implementation. For instance, in one example, a frame may be sent every 16 milliseconds (ms) such that approximately 60 frames of initial or update asset data may be provided to the client device every second. In some examples, this frame rate may be related to a video frame rate representing how many visual frames depicting the virtual world are presented per second. In other examples, it will be understood that this frame rate for asset data transfer may be independent from and unrelated to the video frame rate.

In some examples, the initial data for each asset may be transmitted prior to update data for any assets being provided. In other words, these examples may perform operation 806 of the initial phase 802 for each asset prior to commencing the update phase 804 with operation 808 for any asset.

In other examples, however, this may not be the case. For instance, a priority accumulator system may be configured to start updating certain assets before other assets have been initially replicated. More precisely, a priority accumulator system may track and update a first priority value for a first asset and a second priority value for a second asset such that the update phase 804 of the replicating of the first asset and the transmitting of update data (operation 808) representative of the first asset begins prior to the initial phase 802 of the replicating of the second asset and the transmitting of the initial data (operation 806) representative of the second asset.

To illustrate how initial and update phases may be performed and prioritized in the replication of various assets, FIG. 9 shows illustrative snapshots at several points in time of an illustrative priority queue 900 that will be understood to be managed by a priority accumulation system of system 100 (similar to priority accumulation system 502 described above but not explicitly shown in FIG. 9). Specifically, similar to priority queues 500 and 700 described above, FIG. 9 labels a first snapshot at time T1 along a timeline ("Time") as priority queue 900-T1, a second snapshot at time T2 along the timeline as priority queue 900-T2, and a third snapshot at time T3 along the timeline as priority queue 900-T3.

In each snapshot of priority queue 900, initial asset data ("init") and update asset data ("updt") for different attributes ("mesh," "xform," "audio," and "phys") and different virtual objects 404 ("obj1," "obj2," "obj3," and "obj4") are each assigned different priority values that change over time as the prioritized replication takes place. At time T1, priority queue 900-T1 is shown to include initial data transfers for each asset, similar to priority queue 700-T1, described above. However, as the prioritized replication begins and time passes, it may be the case that certain assets need to be updated and that the priority accumulator system determines that these updates are higher priority than the initial replication of some of the lower-priority assets. Accordingly, as shown in priority queue 900-T2, for example, updates for the textured mesh and transform component attributes of virtual object 404-1 (obj1.mesh.updt and obj1.xform.updt) are assigned high priority values of 99, thereby putting them higher in the queue than many of the initial data transfers for other virtual objects such as, for example, the textured mesh and transform component attributes of virtual object 404-3 (obj3.mesh.init and obj3.xform.init), which are assigned priority values of 95 at time T2.

With the passage of time and each new data frame that is transmitted, the priority accumulation system of system 100 may be configured to update the priority values in a manner that prioritizes more relevant assets over less relevant assets (as has been described) but that also guarantees that each instance of asset data (i.e., each initial transfer and each update) eventually arrives at the top of the priority queue. Accordingly, even if virtual object 404-1 (the most proximate and relevant virtual object in this example) is continuously changing and in need of being updated, the priority accumulator system may assign priority values to assets associated with less proximate and relevant virtual objects (e.g., virtual object 404-4 in this example) in a manner that ensures that those assets eventually rise to the top of priority queue 900. For example, with each new frame that is transmitted, asset data that remains in the priority queue may be automatically increased in priority so that even if it was initially considered to be very low priority, the priority value of each asset will eventually increase enough for the asset to be replicated.

Figure 9:
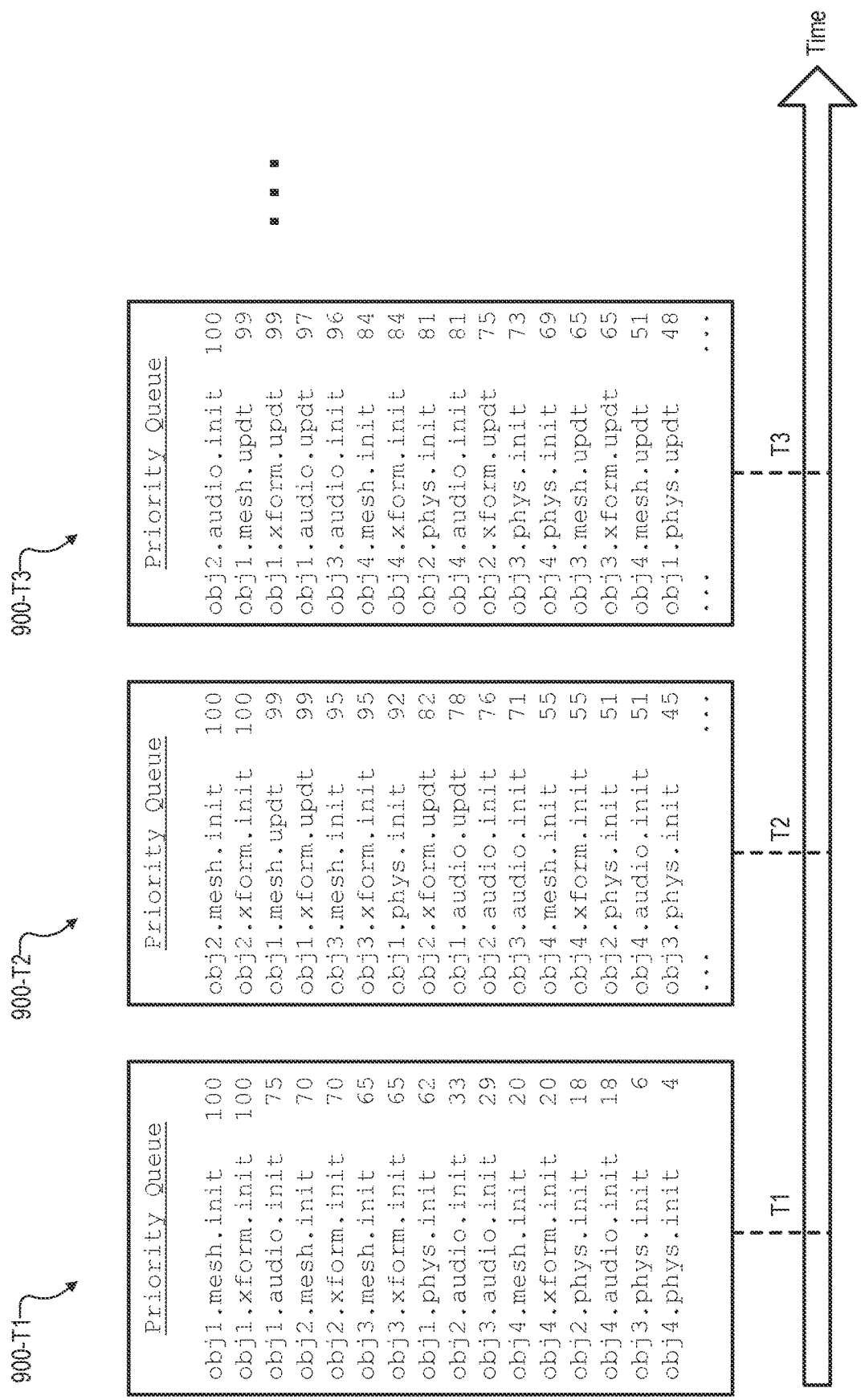
FIG. 9 shows illustrative snapshots at several points in time of another illustrative priority queue managed by a priority accumulation system in accordance with principles described herein.

The initial replication phase for the physics component attribute of virtual object 404-4 (obj4.phys.init) illustrates an example of this principle in FIG. 9. Specifically, while this asset is only given a priority value of 4 at time T1 (see priority queue 900-T1), that priority value has been increased to 69 by time T3 (see priority queue 900-T3). In this way, obj4.phys.init is guaranteed to eventually rise to the top of priority queue 900 and be replicated even if other more important assets continue to change and require updating.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
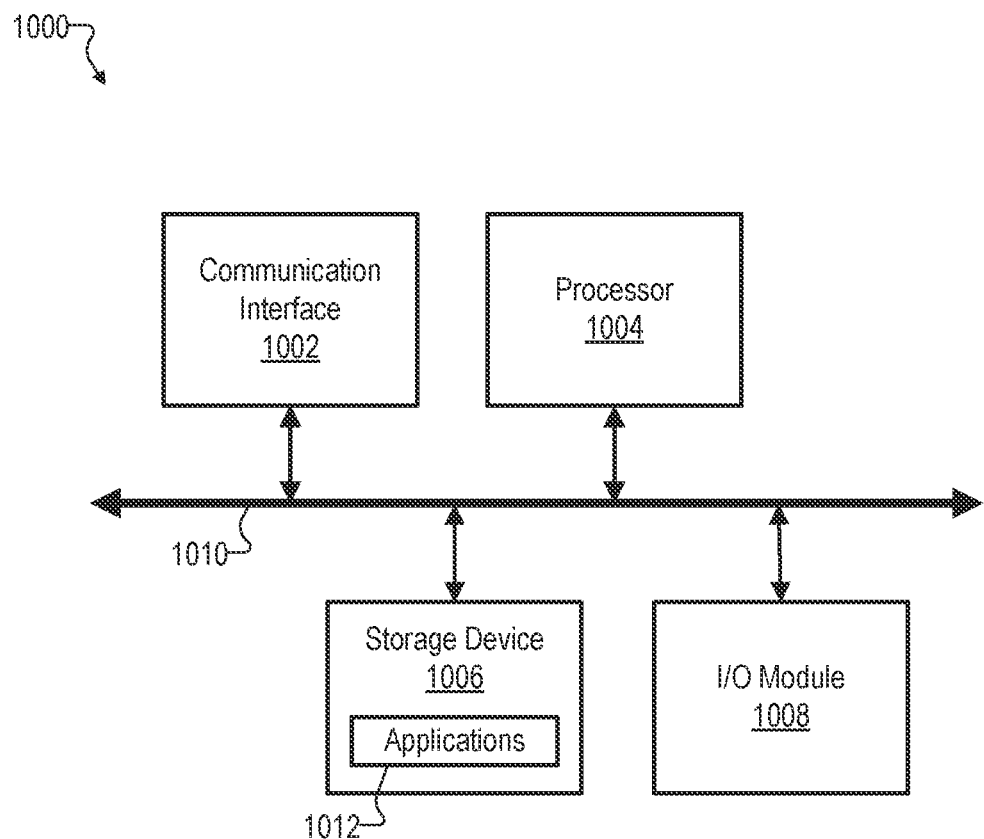
FIG. 10 shows an illustrative computing device that may implement server systems and/or other systems and devices in accordance with principles described herein.

FIG. 10 shows an illustrative computing device 1000 that may implement server systems and/or other systems and devices described herein in accordance with principles described herein. For example, computing device 1000 may include or implement (or partially implement) a server system such as system 100, any component included therein (a priority accumulation system), or any system associated therewith. For instance, computing device 1000 may implement any of client devices 304, elements of network 302, and/or other devices or systems described herein.

As shown in FIG. 10, computing device 1000 may include a communication interface 1002, a processor 1004, a storage device 1006, and an input/output (I/O) module 1008 communicatively connected via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
    receiving, by a server system, a request from a client device to join a virtual world managed by the server system;
    identifying, by the server system and in response to receiving the request, an avatar location for an avatar that is to represent a user of the client device within the virtual world when the client device joins the virtual world;
    determining, by the server system and based on the avatar location, a first priority value for a first asset of the virtual world and a second priority value for a second asset of the virtual world, the first priority value higher than the second priority value; and
    providing, by the server system to the client device and based on the first and second priority values, a prioritized replication of the virtual world in which the first asset and the second asset are replicated in a prioritized manner that includes:
        transmitting initial data representative of the first asset and provided for presentation by the client device to allow the user to experience the first asset,
        transmitting update data representative of the first asset, and
        subsequent to the transmitting of the update data representative of the first asset, transmitting initial data representative of the second asset.

2. The method of claim 1, wherein:
    the prioritized replication of the virtual world includes replicating each of a plurality of assets of the virtual world, including the first and second assets, in both an initial phase and an update phase;
    the initial phase of the replicating of each asset includes transmitting initial data representative of the asset from the server system to the client device;
    the update phase of the replicating of each asset includes transmitting, from the server system to the client device and subsequent to the transmitting of the initial data, update data representative of the asset and reflecting a change to the asset; and
    both the initial phase and the update phase of the replicating of each asset are performed in the prioritized manner based on respective priority values tracked by a priority accumulator system that tracks and updates the respective priority values for each asset.

3. The method of claim 2, wherein the priority accumulator system tracks and updates the first priority value for the first asset and the second priority value for the second asset such that the transmitting of the initial data representative of the second asset is performed subsequent to the transmitting of the update data representative of the first asset based on the first and second priority values tracked and updated by the priority accumulator system.

4. The method of claim 1, wherein:
    the first asset of the virtual world is a first virtual object present in the virtual world; and
    the second asset of the virtual world is a second virtual object present in the virtual world.

5. The method of claim 4, further comprising determining, by the server system, that the first virtual object satisfies a set of predefined priority criteria to a greater degree than the second virtual object satisfies the set of predefined priority criteria;
    wherein the determining of the first and second priority values is based on the determining that the first virtual object satisfies the set of predefined priority criteria to the greater degree than the second virtual object.

6. The method of claim 1, wherein:
    the first asset of the virtual world is a first attribute of a virtual object present in the virtual world; and the second asset of the virtual world is a second attribute of the virtual object.

7. The method of claim 6, wherein one of the first or second attributes of the virtual object is a textured mesh for the virtual object, the textured mesh defining an appearance of the virtual object and a geometric volume of space occupied by the virtual object within the virtual world.

8. The method of claim 6, wherein one of the first or second attributes of the virtual object is a transform component for the virtual object, the transform component defining a position, orientation, and scale of the virtual object within the virtual world.

9. The method of claim 6, wherein one of the first or second attributes of the virtual object is an audio component for the virtual object, the audio component defining virtual sound that is to be simulated as originating from the virtual object within the virtual world.

10. The method of claim 6, wherein one of the first or second attributes of the virtual object is a physics component for the virtual object, the physics component defining a physical property determinative of how the virtual object behaves with respect to the virtual world or other virtual objects within the virtual world.

11. The method of claim 1, wherein:
the first asset of the virtual world is a textured mesh for a virtual object present in the virtual world, the textured mesh defining an appearance of the virtual object and a geometric volume of space occupied by the virtual object within the virtual world;
the second asset of the virtual world is an audio component for the virtual object, the audio component defining virtual sound that is to be simulated as originating from the virtual object within the virtual world; and
the determining of the first priority value for the first asset to be higher than the second priority value for the second asset is based on the first asset being the textured mesh for the virtual object and the second asset being the audio component for the virtual object.

12. The method of claim 1, wherein:
the first asset of the virtual world is a transform component for a virtual object present in the virtual world, the transform component defining a position, orientation, and scale of the virtual object within the virtual world;
the second asset of the virtual world is a physics component for the virtual object, the physics component defining a physical property determinative of how the virtual object behaves with respect to the virtual world or other virtual objects within the virtual world; and
the determining of the first priority value for the first asset to be higher than the second priority value for the second asset is based on the first asset being the transform component for the virtual object and the second asset being the physics component for the virtual object.

13. The method of claim 1, further comprising:
receiving, by the server system subsequent to commencement of the prioritized replication of the virtual world, a second request from the client device to leave the virtual world and join a second virtual world managed by the server system;
determining, by the server system and in response to receiving the second request, respective priority values for a plurality of assets of the second virtual world; and
providing, by the server system to the client device and based on the respective priority values for the plurality of assets of the second virtual world, a prioritized replication of the second virtual world.

14. A system comprising:
a memory storing instructions; and
a processor communicatively coupled to the memory and configured to execute the instructions to:
receive a request from a client device to join a virtual world managed by the system;
identify, in response to receiving the request, an avatar location for an avatar that is to represent a user of the client device within the virtual world when the client device joins the virtual world;
determine, based on the avatar location, a first priority value for a first asset of the virtual world and a second priority value for a second asset of the virtual world, the first priority value higher than the second priority value; and
provide, to the client device and based on the first and second priority values, a prioritized replication of the virtual world in which the first asset and the second asset are replicated in a prioritized manner that includes:
transmitting initial data representative of the first asset and provided for presentation by the client device to allow the user to experience the first asset,
transmitting update data representative of the first asset, and
subsequent to the transmitting of the update data representative of the first asset, transmitting initial data representative of the second asset.

15. The system of claim 14, wherein:
the prioritized replication of the virtual world includes replicating each of a plurality of assets of the virtual world, including the first and second assets, in both an initial phase and an update phase;
the initial phase of the replicating of each asset includes transmitting initial data representative of the asset from the system to the client device;
the update phase of the replicating of each asset includes transmitting, from the system to the client device and subsequent to the transmitting of the initial data, update data representative of the asset and reflecting a change to the asset; and
both the initial phase and the update phase of the replicating of each asset are performed in the prioritized manner based on respective priority values tracked by a priority accumulator system that tracks and updates the respective priority values for each asset.

16. The system of claim 15, wherein the priority accumulator system tracks and updates the first priority value for the first asset and the second priority value for the second asset such that the transmitting of the initial data representative of the second asset is performed subsequent to the transmitting of the update data representative of the first asset based on the first and second priority values tracked and updated by the priority accumulator system.

17. The system of claim 14, wherein:
the first asset of the virtual world is a first virtual object present in the virtual world;
the second asset of the virtual world is a second virtual object present in the virtual world;
the processor is further configured to execute the instructions to determine that the first virtual object satisfies a set of predefined priority criteria to a greater degree than the second virtual object satisfies the set of predefined priority criteria; and
the determining of the first and second priority values is based on the determining that the first virtual object satisfies the set of predefined priority criteria to the greater degree than the second virtual object.

18. The system of claim 14, wherein:
the first asset of the virtual world is a first attribute of a virtual object present in the virtual world;
the second asset of the virtual world is a second attribute of the virtual object; and
the first and second attributes of the virtual object are each implemented by different virtual object attributes selected from:
   a textured mesh for the virtual object, the textured mesh defining an appearance of the virtual object and a geometric volume of space occupied by the virtual object within the virtual world,
   a transform component for the virtual object, the transform component defining a position, orientation, and scale of the virtual object within the virtual world,
   an audio component for the virtual object, the audio component defining virtual sound that is to be simulated as originating from the virtual object within the virtual world, and
   a physics component for the virtual object, the physics component defining a physical property determinative of how the virtual object behaves with respect to the virtual world or other virtual objects within the virtual world.

19. The system of claim 14, wherein the processor is further configured to execute the instructions to:
receive, subsequent to commencement of the prioritized replication of the virtual world, a second request from the client device to leave the virtual world and join a second virtual world managed by the system;
determine, in response to receiving the second request, respective priority values for a plurality of assets of the second virtual world; and
provide, to the client device and based on the respective priority values for the plurality of assets of the second virtual world, a prioritized replication of the second virtual world.

20. A non-transitory computer-readable medium storing instructions that, when executed, direct a processor of a server system to:
receive a request from a client device to join a virtual world managed by the server system;
identify, in response to receiving the request, an avatar location for an avatar that is to represent a user of the client device within the virtual world when the client device joins the virtual world;
determine, based on the avatar location, a first priority value for a first asset of the virtual world and a second priority value for a second asset of the virtual world, the first priority value higher than the second priority value; and
provide, to the client device and based on the first and second priority values, a prioritized replication of the virtual world in which the first asset and the second asset are replicated in a prioritized manner that includes:
   transmitting initial data representative of the first asset and provided for presentation by the client device to allow the user to experience the first asset,
   transmitting update data representative of the first asset, and
   subsequent to the transmitting of the update data representative of the first asset, transmitting initial data representative of the second asset.

* * * * *